United States Patent Office.

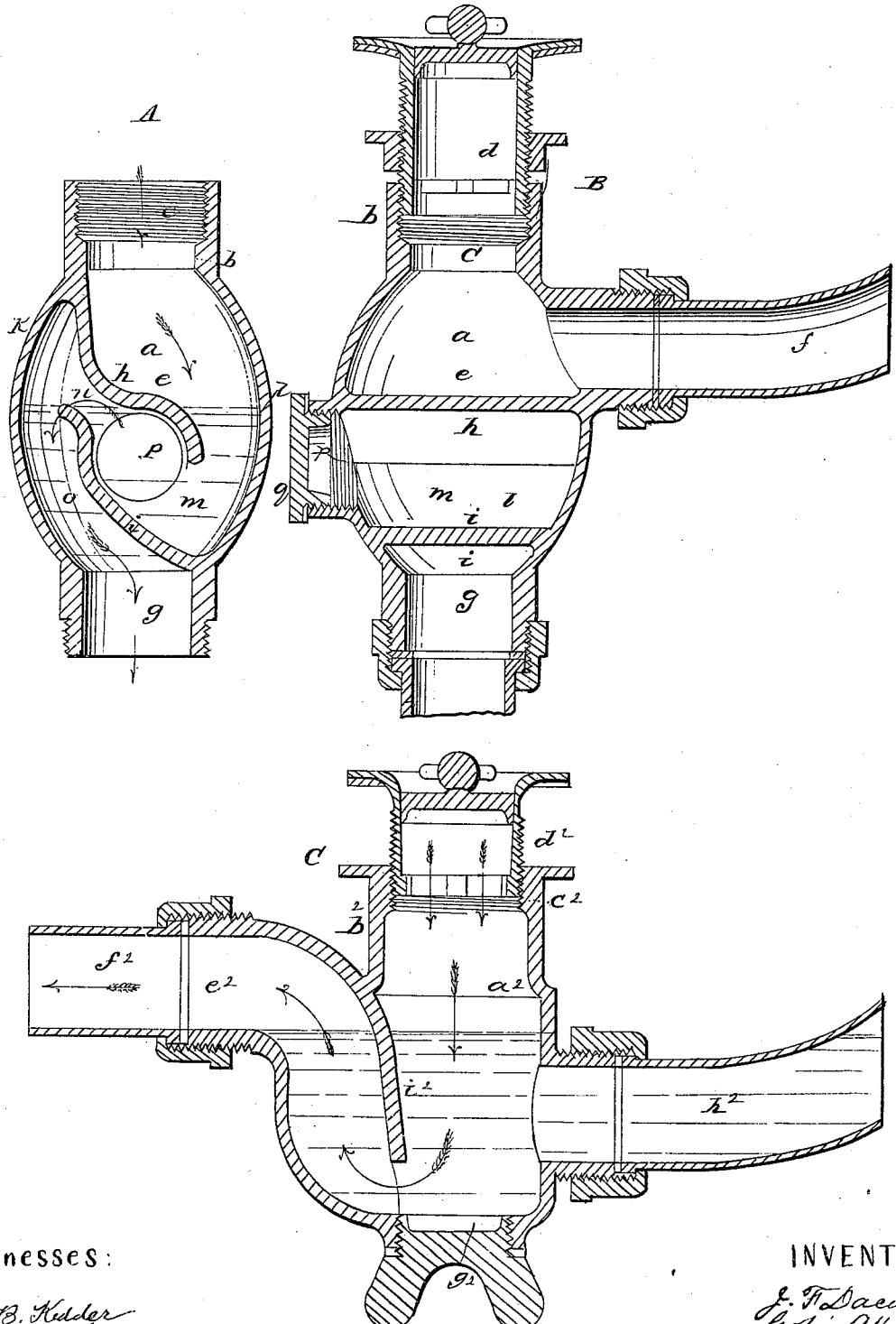

JAMES F. DACEY, OF CHARLESTOWN, MASSACHUSETTS.

Letters Patent No. 92,020, dated June 29, 1869.

IMPROVEMENT IN STENCH-TRAPS.

The Schedule referred to in these Letters Patent and making part of the same.

*To all whom it may concern:*

Be it known that I, JAMES F. DACEY, of Charlestown, in the county of Middlesex, and State of Massachusetts, have invented an Improved Stench-Trap; and I do hereby declare that the following, taken in connection with the drawings which accompany and form part of this specification, is a description of my invention, sufficient to enable those skilled in the art to practise it.

The invention relates to the construction of a stench-trap for sinks and wash-bowls, with reference to such arrangement of the outlet-pipe as shall bring the trap into the smallest practical compass, to enable it to be readily fitted to a bowl or outlet from a sink.

Stench-traps made like that shown in the accompanying drawing at $c$, are now to some extent in use, said trap consisting of a vertical body or chamber, $a^2$, the neck $b^2$ of which is screwed to the under surface of the bowl by a hollow screw, $c^2$, which extends through the outlet of the bowl, and receives the plug or stopper $d^2$.

In the chamber $a^2$ is a partition, $i^2$, which divides off one side of the chamber, from which divided part leads the outlet $e^2$, the partition extending not quite to the bottom of the chamber, and the passage under the partition being below the level of the pipe $f^2$, leading from the outlet $e^2$; while at the bottom of the chamber is a screw-plug, $g^2$, by removal of which the solid sediment collected in the chamber can be at any time removed.

Into the main chamber leads the overflow-pipe $h^2$, which runs from the upper part of the bowl.

Now the principal object of my invention is to so make a trap that the waste or outlet-pipe leads off from the bottom of the chamber or body of the trap, instead of laterally therefrom, as shown at C; and it is in a stench-trap having within it two partitions, so arranged as to seal the outlet-pipe, said outlet-pipe leading vertically and directly from the trap, that my invention consists.

A stench-trap embodying the improvement is shown at A and B, in the drawings; at A, in the vertical cross-section, and at B in vertical longitudinal section.

$a$ denotes the body of the trap, the neck $b$ of which is fastened to the under side of the bowl by the screw-tube or coupling $c$, in which the stopper or plug $d$ is placed, this tube leading directly from the bowl into the main chamber $e$ of the trap.

$f$ is the overflow-tube, connected with the pipe which leads from the top of the bowl, this tube preferably entering the upper part of the chamber $e$, as seen at B.

From the bottom of the trap, in a vertical line with the inlet-tube, leads the outlet-tube $g$, and between the outlet and inlet are arranged partitions by which the outlet is kept sealed by water within the chamber $e$. These partitions are shown at $h$ and $i$. They extend cross-wise of the chamber, as seen at B.

The upper one $h$, springs from one wall, $k$, of the chamber, at the top thereof, and extends down and over towards the opposite wall $l$, leaving a passage, $m$, under its bottom edge, as seen at A; and the lower partition $i$ springs from the wall $l$, at the bottom thereof, and extends over towards the wall $k$, and up towards the partition $h$, leaving a passage, $u$, between its upper edge and the partition $i$, said upper edge being above the level of the lower edge of the partition $h$, as seen at A.

The water flowing from the bowl or sink has to pass down through the main chamber $e$, under the partition $h$, up between the partitions $h$ $i$, and over the partition $i$, and thence down through an auxiliary chamber $o$ into and through the outlet $g$, into the drain-pipe; and the relative position of the edges of the two partitions keeps the chamber filled with water up to the level of the partition $i$, and above the level of the bottom of the partition $h$, thus sealing the trap at each edge.

On one side of the chamber $e$ is an outlet, $p$, closed by a screw-plug, $q$, by removal of which the solid sediment settling to the bottom of the chamber can be removed.

It will readily be seen that the improved trap can be applied in a very narrow space, no room being taken up except that in a direct vertical line with the waste-pipe, so that in any place where a bowl can be set, with a waste-pipe leading from it, the trap can be used.

I claim a stench-trap, constructed with the partitions $h$ and $i$, outlet $g$, outlet $p$, and screw-plug $q$, relatively arranged, substantially as shown and described.

Also, the combination, with partitions $h$ and $i$, when arranged as above set forth, of the overflow-pipe $f$, arranged as shown and described.

JAMES F. DACEY.

Witnesses:
J. B. CROSBY,
FRANCIS GOULD.